United States Patent
Takahashi et al.

(10) Patent No.: US 8,807,853 B2
(45) Date of Patent: Aug. 19, 2014

(54) FOCAL PLANE SHUTTER AND OPTICAL APPARATUS PROVIDED WITH SAME

(71) Applicant: Seiko Precision Inc., Narashino (JP)

(72) Inventors: Hiroshi Takahashi, Narashino (JP); Minori Murata, Narashino (JP); Chiaki Nemoto, Narashino (JP); Shoichi Tokura, Narashino (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 14/023,734

(22) Filed: Sep. 11, 2013

(65) Prior Publication Data

US 2014/0010526 A1 Jan. 9, 2014

Related U.S. Application Data

(63) Continuation of application No. PCT/JP2012/075554, filed on Oct. 2, 2012.

(30) Foreign Application Priority Data

Dec. 20, 2011 (JP) .................................. 2011-278798

(51) Int. Cl.
*G03B 9/08* (2006.01)

(52) U.S. Cl.
USPC ......................................................... 396/469

(58) Field of Classification Search
USPC ......................................................... 396/469
See application file for complete search history.

(56) References Cited

U.S. PATENT DOCUMENTS

| | | | | | |
|---|---|---|---|---|---|
| 4,231,650 | A | * | 11/1980 | Saito et al. | 396/456 |
| 4,316,661 | A | * | 2/1982 | Saito | 396/467 |
| 4,326,786 | A | * | 4/1982 | Uchiyama et al. | 396/456 |
| 4,408,856 | A | * | 10/1983 | Suzuki et al. | 396/466 |
| 4,487,492 | A | * | 12/1984 | Toyoda et al. | 396/466 |
| 5,543,880 | A | * | 8/1996 | Matsubara et al. | 396/452 |
| 5,594,521 | A | * | 1/1997 | Hasuda et al. | 396/453 |
| 5,664,247 | A | * | 9/1997 | Hasuda et al. | 396/456 |
| 7,380,999 | B2 | * | 6/2008 | Toyoda | 396/466 |
| 7,972,069 | B2 | * | 7/2011 | Shintani | 396/452 |
| 8,025,448 | B2 | * | 9/2011 | Kim et al. | 396/452 |
| 2001/0026687 | A1 | * | 10/2001 | Kosaka et al. | 396/452 |
| 2001/0028799 | A1 | * | 10/2001 | Nakagawa | 396/484 |
| 2004/0076422 | A1 | * | 4/2004 | Toyoda | 396/452 |
| 2006/0067676 | A1 | * | 3/2006 | Toyoda | 396/466 |

FOREIGN PATENT DOCUMENTS

JP S56-109323 8/1981
JP 2011-13539 A1 1/2011

OTHER PUBLICATIONS

International Search Report for International Application No. PCT/JP2012/075554 dated Jan. 15, 2013.
Notification of Reasons for Refusal issued by the Japanese Patent Office on May 27, 2014 in counterpart application No. 2011-278798 with English translation.

* cited by examiner

*Primary Examiner* — Rodney Fuller
(74) *Attorney, Agent, or Firm* — Kratz, Quintos & Hanson, LLP

(57) ABSTRACT

A focal plane shutter includes: a board including an opening; a leading blade and a trailing blade opening and closing the opening; first and second drive members respectively driving the leading blade and the trailing blade; first and second actuators respectively driving the first and second drive members; a first biasing member biasing the first drive member to move the leading blade away from the opening; and a second biasing member biasing the second drive member to move the trailing blade away from the opening.

7 Claims, 5 Drawing Sheets

US 8,807,853 B2

FOCAL PLANE SHUTTER AND OPTICAL APPARATUS PROVIDED WITH SAME

CROSS-REFERENCE TO RELATED APPLICATION

This application is a continuation of and claims priority to International Patent Application No. PCT/JP2012/075554 filed on Oct. 2, 2012, which claims priority to Japanese Patent Application No. 2011-278798 filed on Dec. 20, 2011, subject matter of these patent documents is incorporated by reference herein in its entirety.

BACKGROUND (i) Technical Field

The present invention relates to focal plane shutters and optical apparatuses provided with the same.

(ii) Related Art

In an optical apparatus electrically storing captured images, it is proposed that an image pickup element is used as a conventional finder. In this case, the image pickup element has to capture an object before taking a picture. A focal plane shutter used for such an optical apparatus has to keep an opening opened. Also, the image pickup element has to continuously capture an object during movie shooting. In this case, the focal plane shutter also has to keep the opening opened.

Japanese Unexamined Patent Application Publication No. 56-109323 discloses a focal plane shutter equipped with: a leading blade and a trailing blade opening and closing an opening formed in a board; actuators driving the leading blade and the trailing blade, and assist springs biasing the leading blade and the trailing blade in respective moving directions.

In such a case where the image pickup element is used as the conventional finder, the leading blade and the trailing blade are positioned away from the opening to keep the opening opened before taking a picture or during movie shooting. In such a case, when the impact is applied to the optical apparatus, the leading blade or the trailing blade might move toward the opening. In particularly, in a case where the trailing blade is biased in the moving direction as disclosed in Japanese Unexamined Patent Application Publication No. 56-109323, such a problem might arise.

SUMMARY

It is thus object of the present invention to provide a focal plane shutter and an optical apparatus provided with the same suppressing a leading blade or a trailing blade from unintentionally closing an opening with a simple structure.

According to an aspect of the present invention, there is provided a focal plane shutter including: a board including an opening; a leading blade and a trailing blade opening and closing the opening; first and second drive members respectively driving the leading blade and the trailing blade; first and second actuators respectively driving the first and second drive members; a first biasing member biasing the first drive member to move the leading blade away from the opening; and a second biasing member biasing the second drive member to move the trailing blade away from the opening.

DETAILED DESCRIPTION

Figure 1:
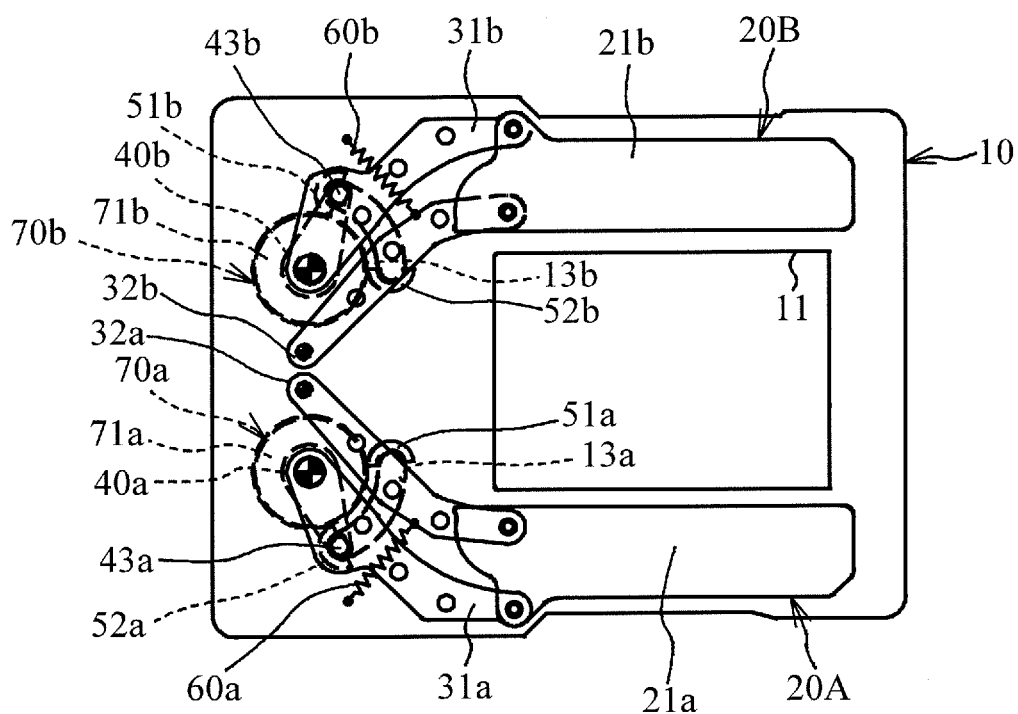
FIG. 1 is a front view of a focal plane shutter according to the present embodiment.

In the following, the embodiment will be described with reference to drawings. FIG. 1 is a front view of a focal plane shutter 1 according to the present embodiment. The focal plane shutter 1 includes: a board 10 including an opening 11; a leading blade 20A and a trailing blade 20B opening and closing the opening 11; an arm 31a and an assist arm 32a for driving the leading blade 20A; and an arm 31b and an assist arm 32b for driving the trailing blade 20B.

The board 10 is made of a synthetic resin, and includes the opening 11 having a rectangular shape. Although the leading blade 20A and the trailing blade 20B each include plural blades, blades 21a and 21b are only illustrated and other blades are omitted in FIG. 1. Each of the blades 21a and 21b is made of a synthetic resin, and is formed into a thin shape. Further, each of the arms 31a and 31b and assist arms 32a and 32b is made of a synthetic resin and has a thin plate shape. These arms are swingably supported by the board 10.

The focal plane shutter 1 includes actuators 70a and 70b as drive sources respectively driving the leading blade 20A and the trailing blade 20B. The actuators 70a and 70b respectively include rotors 71a and 71b that are rotatable within a predetermined range in both directions. Each of the rotors 71a and 71b is a permanent magnet magnetized to have plural magnetic poles in the circumferential direction. The actuator 70a includes a non-illustrative stator and a non-illustrative coil wound therearound, beside the rotor 71a. The energization of the coil excites the stator, so the rotor 71a is rotated by the magnetic attractive force and repulsive force exerted between the stator and the rotor 71a. Likewise, the actuator 70b has the same arrangement. The rotors 71a and 71b are secured with a leading blade drive lever (hereinafter referred to as a drive lever) 40a and a trailing blade drive lever (hereinafter referred to as a drive lever) 40b, respectively.

The rotation of the rotor 71a causes the drive lever 40a to swing within a predetermined range. The drive lever 40a is formed with a projection portion 43a at its end. The projection portion 43a is fitted into a fitting hole of the arm 31a. Further, the board 10 is formed with an escape slot 13a releasing the projection portion 43a and having an arc shape. The abutment of the projection portion 43a with an end portion of the escape slot 13a restricts the swingable range of the drive lever 40a.

One end and the other end of the escape slot 13a are respectively provided with buffering members 51a and 52a. The projection portion 43a of the drive lever 40a abuts with the buffering member 51a or 52a, thereby suppressing the drive lever 40a from bounding. In the state where the leading blade 20A is positioned away from the opening 11, the plural blades that comprise the leading blade 20A are in an overlapped state, and the projection portion 43a of the drive lever 40a abuts with the buffering member 52a. In the state where the leading blade 20A closes the opening 11, the plural blades that comprise the leading blade 20A expand and close the opening 11, and the projection portion 43a of the drive lever 40a abuts with the buffering member 51a.

Likewise, the drive lever 40b includes a projection portion 43b fitting into a fitting hole of the arm 31b. One end and the other end of an escape slot 13b are respectively provided with buffering members 51b and 52b. In the state where the trailing blade 20B is positioned away from the opening 11, the plural blades that comprise the trailing blade 20B are in an overlapped state, and the projection portion 43b of the drive lever 40b abuts with the buffering member 51b. In the state where the trailing blade 20B closes the opening 11, the plural blades that comprise the trailing blade 20B expand and close the opening 11, and the projection portion 43b of the drive lever 40b abuts with the buffering member 52b. The buffering members 51a, 52a, 51b, and 52b are, for example, rubbers or sponges. The buffering members 51a, 52a, 51b, and 52b are examples of a first buffering member, a second buffering member, a third buffering member, and a fourth buffering member, respectively. The escape slots 13a and 13b are examples of first and second escape holes, respectively.

For example, in continuous shooting, the drive levers 40a and 40b reciprocate within a predetermined range in a short period. For this reason, both ends of the escape slots 13a and 13b are respectively provided with such buffering members, so the impact of the drive levers 40a and 40b can be absorbed.

With the above configuration, the rotation of the rotor 71a causes the drive lever 40a to swing, thereby enabling the arm 31a to swing. Therefore, the leading blade 20A moves to open or close the opening 11. Likewise, the rotation of the rotor 71b causes the drive lever 40b to swing, thereby enabling the arm 31b to swing. Therefore, the trailing blade 20B moves to open or close the opening 11. The drive lever 40a, the arm 31a, and the assist arm 32a are examples of a first drive member driving the leading blade 20A. The actuators 70a and 70b are examples of first and second actuators, respectively. The drive lever 40b, the arm 31b, and the assist arm 32b are examples of a second drive member driving the trailing blade 20B. The drive levers 40a and 40b are examples of first and second drive levers, respectively. The arms 31a and 31b are examples of first and second arms, respectively.

Figure 2:
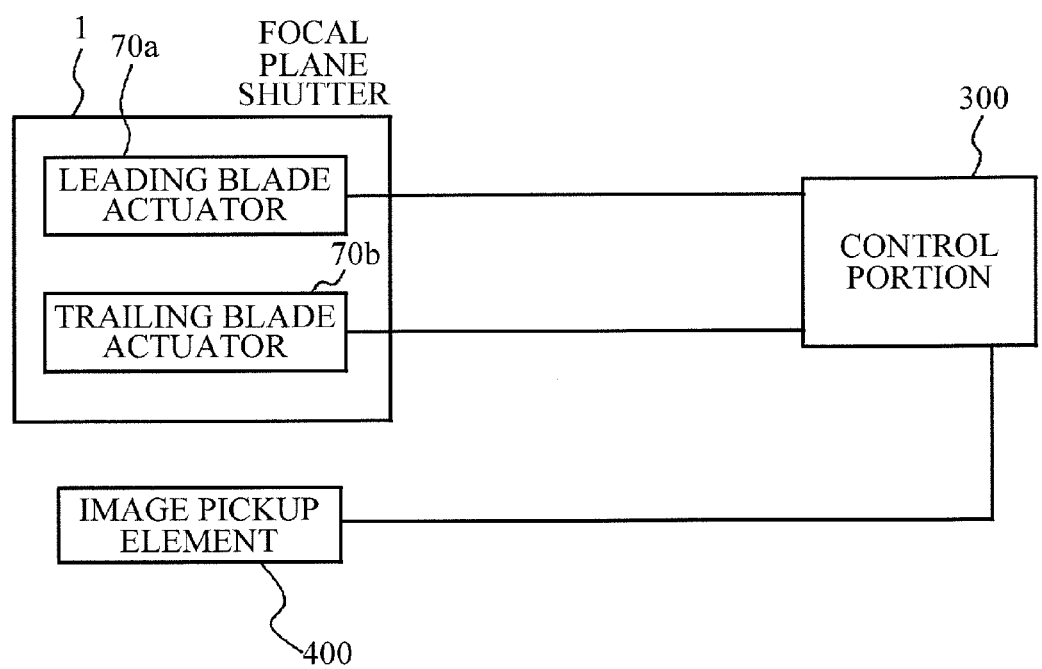
FIG. 2 is a block diagram of a camera including the focal plane shutter.

Herein, a description will be given of a configuration of a camera as an example of an optical apparatus equipped with the focal plane shutter 1. FIG. 2 is a block diagram of the camera equipped with the focal plane shutter 1. The camera includes: the focal plane shutter 1; a control portion 300; and an image pickup element 400. The control portion 300 controls an operation of the whole camera and includes a CPU, a ROM, and a RAM. Additionally, the camera includes lenses, not illustrated in FIG. 2, for adjusting a focal length.

The control portion 300 controls energization states of the coils of the actuators 70a and 70b. The image pickup element 400 changes an object image into electric signals. The image pickup element 400 is, for example, a CCD or a CMOS.

Additionally, there is not provided a set member for respectively positioning the leading blade 20A and the trailing blade 20B at charging positions. This is because the leading blade 20A and the trailing blade 20B can be positioned at the charging positions by the rotors 71a and 71b that are rotatable in both directions.

Figure 3:
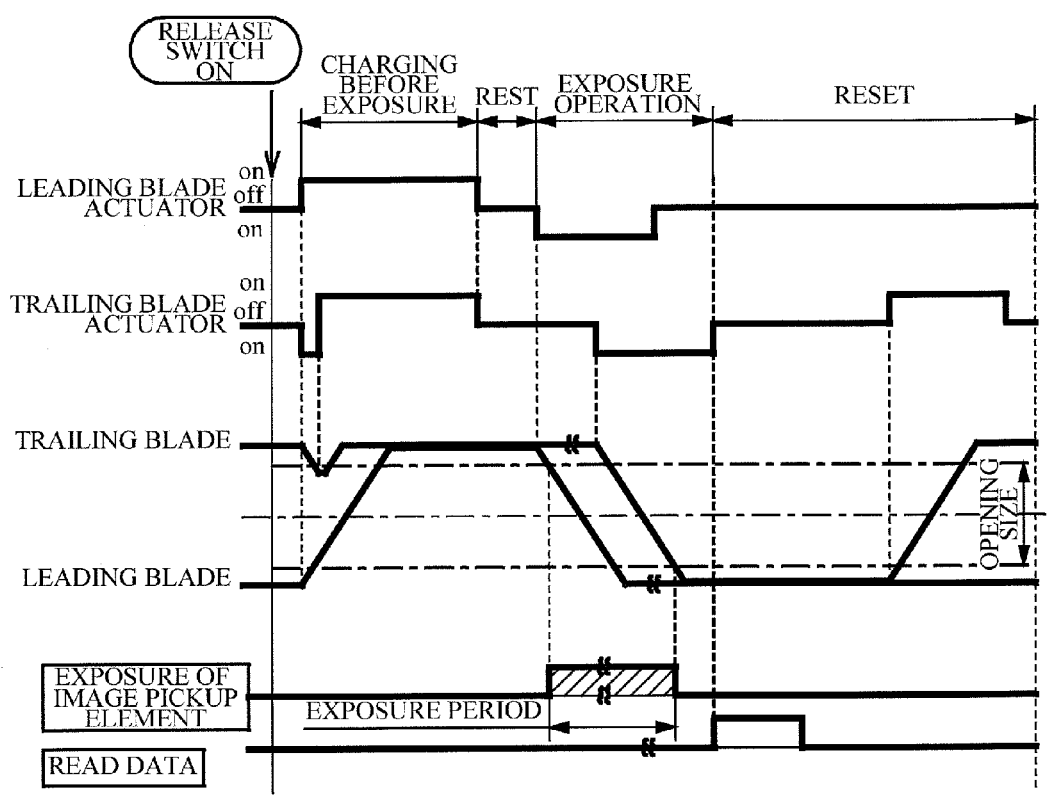
FIG. 3 is a timing chart of the focal plane shutter.

Next, a description will be given of the operation of the focal plane shutter 1. FIG. 3 is a timing chart of the focal plane shutter 1. FIG. 1 illustrates an initial state of the focal plane shutter 1. In the initial state, as illustrated in FIG. 1, the leading blade 20A and the trailing blade 20B are positioned away from the opening 11 to keep a fully opened state.

After that, a release button of the camera is pushed to start a charging operation. When the charging operation starts, the coil of the actuator 70a is energized, so the leading blade 20A moves to close the opening 11 against biasing force of a biasing member as will be described later. Further, after the coil of the actuator 70b is energized to temporally move the trailing blade 20B toward the opening 11, the current direction of the coil of the actuator 70b is changed to move the trailing blade 20B away from the opening 11.

After that, the energization of the coils of the actuators 70a and 70b is stopped in the state where the leading blade 20A closes the opening 11 and the trailing blade 20B are positioned away from the opening 11. In such a way, the charging operation is finished.

When a predetermined rest period elapses after the charging operation, an exposure operation starts. When the exposure operation starts, the coil of the actuator 70a is energized, and the leading blade 20A moves to open the opening 11 by use of the biasing force of the biasing member as will be described later. After a predetermined period elapses from the time when the coil of the actuator 70a is energized, the coil of the actuator 70b is energized, so the trailing blade 20B moves to close the opening 11 against the biasing force of the biasing member as will be described later. When the leading blade 20A moves fully away from the opening 11 and the trailing blade 20B fully closes the opening 11, the energization of the coils of the actuators 70a and 70b are stopped. In such a way, the exposure operation is finished. A period from the time when the leading blade 20A starts moving to open the opening 11 to the time when the trailing blade 20B fully closes the opening 11 is referred to as an exposure period.

After the exposure operation is finished, the data are read by the RAM of the control portion 300 or memory of the camera side. Next, the coil of the actuator 70b is energized, and the trailing blade 20B moves away from the opening 11 by use of the biasing force of the biasing member as will be described later. Thus, the state returns to the initial state illustrated in FIG. 1 and the reset is finished.

Also, the fully opened state illustrated in FIG. 1 is maintained during movie shooting. Herein, in the fully opened state during movie shooting or before pushing the release button, the actuators 70a and 70b are in non-energized states. That is, the holding torque of the rotor 71a maintains a state where the projection portion 43a of the drive lever 40a is pushed against the buffering member 52a. Further, the holding torque of the rotor 71b maintains a state where the projection portion 43b of the drive lever 40b is pushed against the buffering member 51b.

Herein, in the focal plane shutter 1 according to the present embodiment, the assist arms 32a and 32b are respectively connected with biasing members 60a and 60b. The biasing members 60a and 60b are coil springs, but not limited to these. For example, the biasing members 60a and 60b may be leaf springs or wire springs. One end of the biasing member 60a is connected with the assist arm 32a, and the other end of the biasing member 60a is connected with the board 10. One end of the biasing member 60b is connected with the assist arm 32b, and the other end of the biasing member 60b is connected with the board 10. In the fully opened state, the biasing members 60a and 60b bias the assist arms 32a and 32b to move the leading blade 20A and the trailing blade 20B away from the opening 11, respectively. In such a way, the state where the leading blade 20A and the trailing blade 20B are positioned away from the opening 11 can be maintained by the biasing force of the biasing members 60a and 60b in addition to the holding torque of the rotors 71a and 71b. Thus, such a simple structure can suppress the leading blade 20A or the trailing blade 20B from unintentionally closing the opening 11 or a part of the opening 11 caused by the impact or the like in the fully opened state where the actuators 70a and 70b are not energized. The biasing members 60a and 60b are an example of first and second biasing members.

Figure 4:
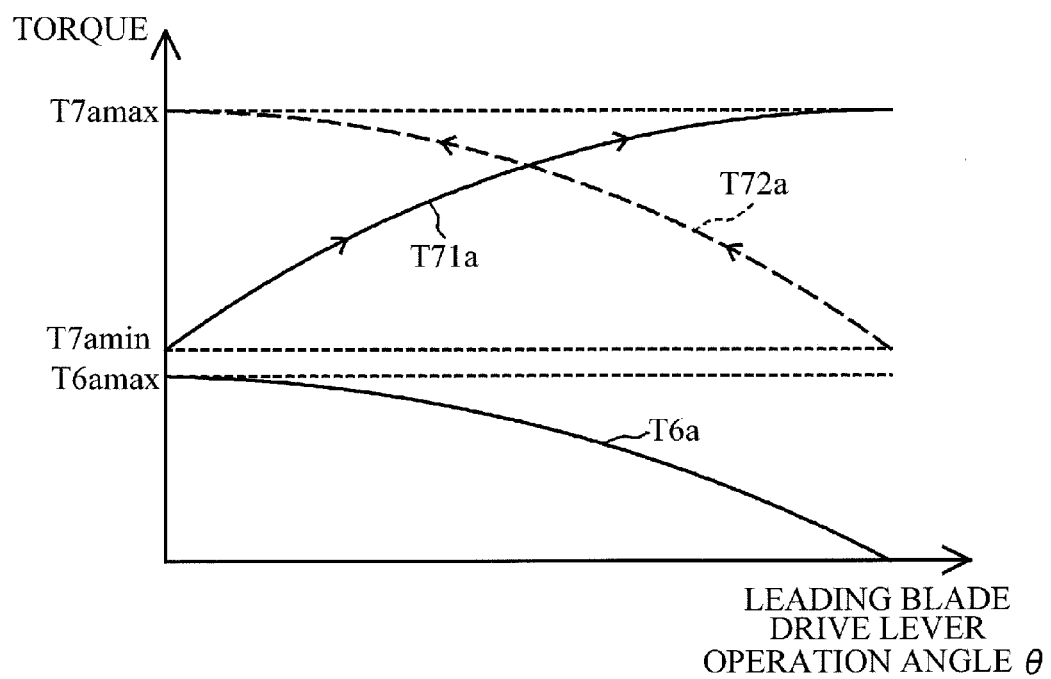
FIG. 4 is a graph illustrating the relationship between torque of a rotor and torque of a biasing member.

FIG. 4 is a graph illustrating the relationship between the torque of the rotor 71a and the torque of the biasing member 60a. A vertical axis indicates torque. A horizontal axis indicates an operation angle of the drive lever 40a. When the projection portion 43a of the drive lever 40a abuts with the buffering member 51a, that is, when the leading blade 20A closes the opening 11, the operation angle of the drive lever 40a is zero degree. When the projection portion 43a of the drive lever 40a abuts with the buffering member 52a, that is, when the leading blade 20A is positioned away from the opening 11, the operation angle of the drive lever 40a is the maximum.

A curved line T71a indicates the magnitude of the torque of the rotor 71a in rotating clockwise. In other words, the curved line T71a indicates the torque of the rotor 71a when the leading blade 20A moves away from the opening 11. A curved line T72a indicates the magnitude of the torque of the rotor 71a in rotating counterclockwise. In other words, the curved line T72a indicates the torque of the rotor 71a when the leading blade 20A moves to close the opening 11. As illustrated in FIG. 2, even when the rotor 71a rotates in any direction, the torque of the rotor 71a has increased during a period from when the rotor 71a starts to when the rotor 71a stops. Further, a starting torque of the rotor 71a shows the minimum value T7a min. Further, the torque of the rotor 71a is the maximum value T7a max, just before the projection portion 43a of the drive lever 40a abuts with the buffering member 51a or 52a.

A curved line T6a indicates the torque of the biasing member 60a. When the operation angle of the drive lever 40a is zero, that is, when the leading blade 20A is positioned to close the opening 11, the biasing member 60a is extending in the longest state, and the torque of the biasing member 60a is the maximum value T6a max. When the operation angle of the drive lever 40a is the maximum, the length of the biasing member 60a is the free length, and the torque of the biasing member 60a is the minimum value of zero. The torque of the biasing member 60a increases as the rotor 71a rotates counterclockwise from the state where the leading blade 20A is positioned away from the opening 11.

Herein, as mentioned in the operation of the focal plane shutter 1, when the leading blade 20A moves from a position to be away from the opening 11 toward a position to close the opening 11, the rotor 71a has to drive the drive lever 40a against the biasing force of the biasing member 60a. Therefore, as illustrated in FIG. 4, the torque of the biasing member 60a is set to be always smaller than that of the rotor 71a in the counterclockwise direction while the rotor 71a is rotating counterclockwise. Specifically, the maximum value T6a max of the torque of the biasing member 60a at the time when the leading blade 20A is positioned to close the opening 11 is set to be smaller than the starting torque T7a min of the rotor 71a at the time when the rotor 71a starts driving the drive lever 40a, in order to move the leading blade 20A from the position to be away from the opening 11 toward the position to close the opening 11. This can rotate the rotor 71a counterclockwise without the influence of the biasing force of the biasing member 60a.

Figure 5:
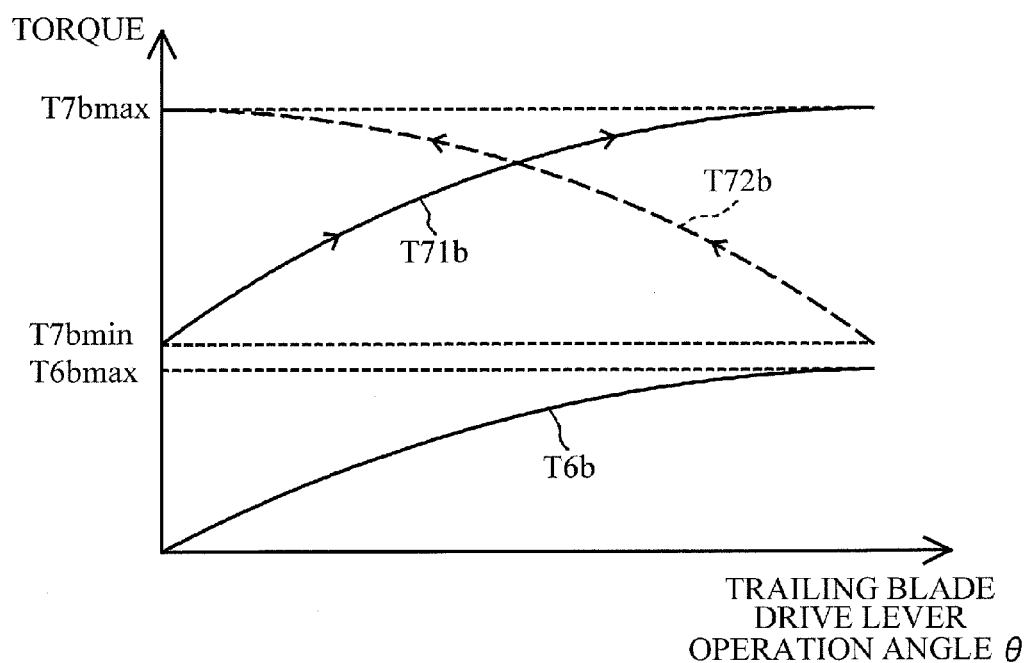
FIG. 5 is a graph illustrating the relationship between torque of a rotor and torque of a biasing member.

FIG. 5 is a graph illustrating the relationship between the torque of the rotor 71b and the torque of the biasing member 60b. When the trailing blade 20B is positioned away from the opening 11, the operation angle of the drive lever 40b is zero. When the trailing blade 20B is positioned to close the opening 11, the operation angle of the drive lever 40b is the maximum. A curved line T71b indicates the magnitude of the torque of the rotor 71b in rotating clockwise. In other words, the curved line T71b indicates the torque of the rotor 71b when the trailing blade 20B moves to close the opening 11. A curved line T72b indicates the magnitude of the torque of the rotor 71b in rotating counterclockwise. In other words, the curved line T72b indicates the torque of the rotor 71b when the trailing blade 20B moves away from the opening 11. A curved line T6b indicates the torque of the biasing member 60b. The torque of the biasing member 60b increases as the rotor 71b rotates clockwise. When the trailing blade 20B is positioned to close the opening 11, the biasing member 60b is extending in the longest state and the torque of the biasing member 60b is the maximum value T6b max. When the operation angle of the drive lever 40b is zero, the length of the biasing member 60b is the free length, and the torque of the biasing member 60b is the minimum value of zero. The torque of the biasing member 60b increases as the rotor 71b rotates counterclockwise from the state where the trailing blade 20B is positioned away from the opening 11.

Herein, as mentioned in the operation of the focal plane shutter 1, when the trailing blade 20B moves from a position to be away from the opening 11 toward a position to close the opening 11, the rotor 71b has to drive the drive lever 40b against the biasing force of the biasing member 60b. Therefore, as illustrated in FIG. 5, the torque of the biasing member 60b is set to be always smaller than that of the rotor 71b in the clockwise direction while the rotor 71b is rotating clockwise. Specifically, the maximum value T6b max of the torque of the biasing member 60b at the time when the trailing blade 20B is positioned to close the opening 11 is set to be smaller than a starting torque T7b min of the rotor 71b at the time when the rotor 71b starts driving the drive lever 40b, in order to move the trailing blade 20B from the position to be away from the opening 11 toward the position to close the opening 11. This can rotate the rotor 71b clockwise without the influence of the biasing force of the biasing member 60b.

Additionally, the above embodiment has described an example that each of the biasing forces of the biasing members 60a and 60b is the minimum value of zero when the leading blade 20A and the trailing blade 20B are positioned away from the opening 11. However, the present invention is not limited to this. In the above position, each of the biasing forces of the biasing members 60a and 60b may have the minimum.

Further, in the focal plane shutter 1 according to the present embodiment, the biasing force of the biasing member 60a corresponding to the first biasing member can be used for moving the leading blade in the exposure operation after the charging operation is finished. Likewise, the biasing force of the biasing member 60b corresponding to the second biasing member can be used for moving the trailing blade in the reset after the exposure operation is finished. In such a way, the biasing force of the biasing member 60a assists the leading blade in moving in the exposure operation, and the biasing force of the biasing member 60b assists the trailing blade in moving in the reset after the exposure operation is finished. It is thus possible to reduce the power load to be used for the actuators 70a and 70b respectively serving as the drive sources of the leading blade 20A and the trailing blade 20B.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment is applicable to optical apparatuses such as still cameras, and digital cameras.

Also, the above embodiment has described the blades and the arms which are made of a synthetic resin. However, they may have plate shapes made of metal. In the above embodiment, each of the leading blade includes four blades, but is not limited to this. Each of the leading blade and the trailing blade may include from two to five blades.

In the above embodiment, the biasing members 60a and 60b are respectively connected with the assist arms 32a and 32b. However, the present invention is not limited to such a configuration. For example, the biasing member 60a may be connected with the arm 31a or the drive lever 40a. Further, the biasing member 60b may be connected with the arm 31b or the drive lever 40b.

In the above embodiment, as illustrated in FIG. 4, the torque of the biasing member 60a is set to be zero when the operation angle of the drive lever 40a is the maximum. However, the present invention is not limited to such a configuration. The biasing member 60a may be set to pull the assist arm 32a and move the leading blade 20A away from the opening 11, even when the operation angle of the drive lever 40a is the maximum. That is, the biasing member 60a may be set so as to extend longer than the free length thereof even when the operation angle of the drive lever 40a is the maximum. Likewise, the biasing member 60b may have the same arrangement.

Finally, several aspects of the present invention are summarized as follows.

According to an aspect of the present invention, there is provided a focal plane shutter including: a board including an opening; a leading blade and a trailing blade opening and closing the opening; first and second drive members respectively driving the leading blade and the trailing blade; first and second actuators respectively driving the first and second drive members; a first biasing member biasing the first drive member to move the leading blade away from the opening; and a second biasing member biasing the second drive member to move the trailing blade away from the opening.

The leading blade and the trailing blade are biased to move away from the opening, thereby preventing the leading blade and the trailing blade from closing the opening, even when the impact or the like is applied to the focal plane shutter in a state where the leading blade and the trailing blade are positioned away from the opening.

According to another aspect of the present invention, there is provided an optical apparatus having the above focal plane shutter.

What is claimed is:

1. A focal plane shutter comprising:
a board including an opening;
a leading blade and a trailing blade opening and closing the opening;
first and second drive members respectively driving the leading blade and the trailing blade;
first and second actuators respectively driving the first and second drive members;
a first biasing member biasing the first drive member to move the leading blade away from the opening; and
a second biasing member biasing the second drive member to move the trailing blade away from the opening,
wherein the first and second actuators respectively include first and second rotors,
wherein the first and second drive members respectively include:
first and second drive levers respectively interlocking with the first and second rotors; and
first and second arms respectively interlocking with the first and second drive levers, and
wherein the first and second arms are always connected with the leading blade and the trailing blade, respectively.

2. The focal plane shutter of claim 1, wherein the first biasing member assists the leading blade to move when exposure operation is performed, a biasing force of the first biasing member is the minimum when the leading blade is positioned away from the opening, the second biasing member assists the trailing blade to move when reset is performed after the exposure operation, and a biasing force of the second biasing member is the minimum when the trailing blade is positioned away from the opening.

3. The focal plane shutter of claim 1, wherein a torque of the first biasing member at the time when the leading blade closes the opening is smaller than a starting torque of the first actuator at the time of driving the first drive member to move the leading blade from a position to be away from the opening toward a position to close the opening.

4. The focal plane shutter of claim 1, wherein
the first drive member includes a first drive lever interlocking with the first actuator, and a first arm interlocking with the first drive lever and swingably supported by the board,
the board includes a first escape hole releasing movement of the first drive lever,
one end of the first escape hole is provided with a first buffering member, and
the other end of the first escape hole is provided with a second buffering member.

5. The focal plane shutter of claim 1, wherein a torque of the second biasing member at the time when the trailing blade closes the opening is smaller than a starting torque of the second actuator at the time of driving the second drive member to move the trailing blade from a position to be away from the opening toward a position to close the opening.

6. The focal plane shutter of claim 1, wherein the second drive member includes a second drive lever interlocking with the second actuator, and a second arm interlocking with the second drive lever and swingably supported by the board,
the board includes a second escape hole releasing movement of the second drive lever,
one end of the second escape hole is provided with a third buffering member, and
the other end of the second escape hole is provided with a fourth buffering member.

7. An optical apparatus comprising a focal plane shutter comprising: a board including an opening; a leading blade and a trailing blade opening and closing the opening; first and second drive members respectively driving the leading blade and the trailing blade; first and second actuators respectively driving the first and second drive members; a first biasing member biasing the first drive member to move the leading blade away from the opening; and a second biasing member biasing the second drive member to move the trailing blade away from the opening,
wherein the first and second actuators respectively include first and second rotors,
wherein the first and second drive members respectively include:
first and second drive levers respectively interlocking with the first and second rotors; and
first and second arms respectively interlocking with the first and second drive levers, and
wherein the first and second arms are always connected with the leading blade and the trailing blade, respectively.

* * * * *